United States Patent Office 3,001,617
Patented Sept. 26, 1961

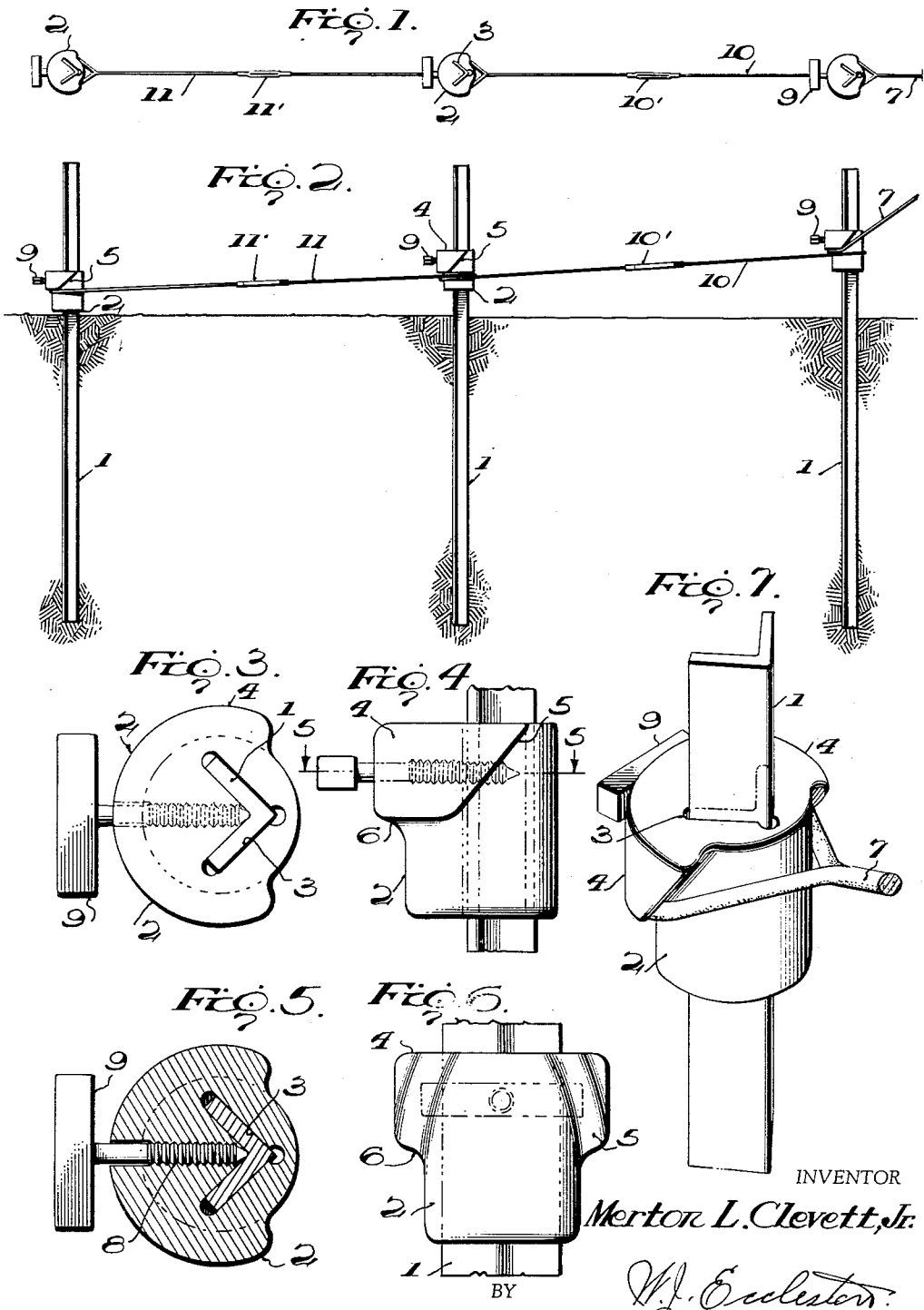

3,001,617
ANGULAR STAKE AND ADJUSTABLE COLLAR
Merton L. Clevett, Jr., East Natick, Mass., assignor to the United States of America as represented by the Secretary of the Army
Filed Aug. 3, 1954, Ser. No. 447,685
1 Claim. (Cl. 189—90)
(Granted under Title 35, U.S. Code (1952), sec. 266)

The invention described herein, if patented, may be manufactured and used by or for the Government for governmental purposes, without the payment to me of any royalty thereon.

This invention relates primarily to detachable collars for angle bars such as may be driven into the ground and used as stakes for guy wires in the erection of tents.

Tests conducted in the Arctic indicate that the angle bar stake affords an excellent means of anchoring guy lines in extremely hard soils. These tests also disclosed that by using the British Drivall tool, or a modified version of such tool the angle bar can be driven into frozen soil, to the proper depth, in about one fifth the time required when sledge hammers were used.

Such tools are generally in the form of weighted metal cylinders closed at their upper ends and adapted to be placed over the upper end of the bar and then raised either manually or otherwise, and allowed to drop onto the upper end of the bar in the manner of a hammer. It is obvious therefore that the upper end of the bar must be devoid of any protuberances or projections which would interfere with the free operation of the cylindrical hammer.

Accordingly, it is an object of the present invention to provide a collar which may be readily clamped to the angle bar, at any desired height, after the bar is driven into the ground, thereby providing a means for anchoring one end of a guy line to the angular stake.

It is another object of the invention to provide a metal collar of substantially cylindrical form provided with a wire or rope-receiving groove and having an angular passage therethrough to permit the collar to be slid onto the upper end of an angle bar after the latter has been driven into position by the cylindrical hammer referred to.

It is a further object of the invention to combine a vertically adjustable collar with a stake, whereby a guy line may be secured to the stake close to the ground regardless of the depth to which the stake is driven into the ground.

Other objects and advantages of the invention will be apparent from the following description when taken in connection with the accompanying drawings, in which FIGURE 1 is a plan view of three of the angular stakes with adjustable collars, in use;

FIGURE 2 is a side elevational view thereof;

FIGURE 3 is a plan view of the collar assembly;

FIGURE 4 is a fragmentary side elevational view of the stake with the collar attached;

FIGURE 5 is a horizontal sectional view taken on the line 5—5 of FIGURE 4;

FIGURE 6 is a side elevational view of the collar at right angles to the view of FIGURE 4; and, FIGURE 7 is a perspective view of the collar and the stake to which it is attached.

Referring to the drawings in more detail the numeral 1 indicates a stake preferably formed of metal and of angular cross section, the angle in the present illustration being a right angle.

As stated above, tests in the Arctic regions indicate that angle bar stakes afford excellent means of anchoring guy lines in extremely hard soils. Also, that by using the British Drivall tool or the like to install angle bar anchors, the operation becomes very efficient as contrasted to the relatively inefficient method of installing stakes with sledge hammers. Since this Drivall type of tool slidably engages over the upper end of the stake it is necessary that the stake be free of protuberances or the like which would interfere with the reciprocating movement to be applied to the tool, and again it is desirable that the guy line or other anchoring means be secured to the post or stake at a point as close to the ground as possible. Consequently the present invention includes a removable and adjustable collar 2.

The collar 2 is of substantially cylindrical form and is provided with a vertically extending passage 3 of a shape and size substantially corresponding to the cross sectional shape and size of the stake or post 1. Adjacent its upper end the collar 2 is provided with an arcuate enlargement 4 which extends approximately half way around the collar and terminates in upwardly inclined surfaces 5, thereby providing a shoulder or seat 6 for a guy line or the like 7, as indicated in FIGURES 1, 2 and 7.

The collar 2 is intended to be removable for the purpose of permitting the Drivall tool to drive the stake 1 into the ground, and is also intended to be adjustable so that the guy line may be applied to the stake or post at a point closely adjacent the ground in which the stake is installed. For this purpose the collar, adjacent its upper end is provided with a threaded opening 8 in which is threaded a setscrew 9 which when threaded into the opening 8 will engage that portion of the post situated in the passage 3, as indicated in FIGURES 3 and 5, and will therefore securely lock the collar 2 in any position along the length of the post or stake 1.

It is sometimes desirable to employ one or more secondary stakes or posts as reinforcement for the primary stake to which the guy line 7 is attached and such reinforcing or supplemental stakes are indicated in FIGURES 1 and 2 in which ropes or cables 10 and 11, provided with turnbuckles 10' and 11' are secured to the lower cylindrical portion of the collars 2 and the turnbuckles 10' and 11' operated to take up any slack in the cables 10 and 11.

From the foregoing description taken in connection with the accompanying drawingss it will be apparent to those skilled in the art that I have devised an exceedingly simple and inexpensive construction of angular stake or post which is well adapted to installation in hard and frozen ground such as found in the Arctic regions, by the Drivall type of tool and that novel means are provided for securing a guy line to the stake at a point close to the ground so as to avoid undue strain upon the stake.

In accordance with the patent statutes I have described what I now consider to be the preferred form of the invention but inasmuch as various minor changes may be made in structural details without departing from the spirit of the invention, it is intended that all such changes be included within the scope of the appended claim.

I claim:

In combination, a metal guy-line stake of angular cross-section, a substantially cylindrical metal collar provided with an angular passage corresponding in shape and size with the angular cross-section of the stake, said stake having its upper end positioned in said passage, an arcuate enlargement on the upper end of the collar, said enlargement extending only partially around said collar to provide a corresponding partial shoulder, said shoulder terminating in laterally spaced ends formed with upwardly inclined convergent surfaces, and means for securing the collar in position on the stake.

References Cited in the file of this patent

UNITED STATES PATENTS

| | | |
|---|---|---|
| 212,775 | Williams | Feb. 25, 1879 |
| 542,370 | Mount | July 9, 1895 |
| 841,645 | Downs | Jan. 15, 1907 |
| 2,429,857 | Verner | Oct. 28, 1947 |
| 2,621,007 | Barbib | Dec. 9, 1952 |

FOREIGN PATENTS

| | | |
|---|---|---|
| 107,586 | Sweden | June 8, 1943 |